United States Patent

Schroeder et al.

[11] Patent Number: 5,951,191
[45] Date of Patent: Sep. 14, 1999

[54] WASHER AND BRACKET COMBINATION FOR AUTOMATICALLY SETTING AN AIR GAP

[75] Inventors: Thaddeus Schroeder, Rochester Hills; Robin Stevenson, Bloomfield Hills, both of Mich.

[73] Assignee: General Motors Corporation, Detroit, Mich.

[21] Appl. No.: 08/986,703

[22] Filed: Dec. 8, 1997

[51] Int. Cl.[6] ........................................... B25G 3/00
[52] U.S. Cl. ................................. 403/13; 403/110
[58] Field of Search .......................... 403/13, 14, 104, 403/105, 106, 110, 404; 411/84, 85; 248/297.21, 297.31, 542; 324/173

[56] References Cited

U.S. PATENT DOCUMENTS

| | | | |
|---|---|---|---|
| 3,700,292 | 10/1972 | Owens | 384/9 |
| 3,865,095 | 2/1975 | Helmick | 124/24.1 |
| 4,469,466 | 9/1984 | Hotz | 403/388 |
| 4,658,168 | 4/1987 | Belart et al. | 310/168 |
| 5,435,202 | 7/1995 | Kitamura | 74/502.4 |
| 5,588,334 | 12/1996 | Lu et al. | 74/502.4 |

FOREIGN PATENT DOCUMENTS

| | | |
|---|---|---|
| 812513 | 4/1959 | United Kingdom . |
| 2202247 | 9/1988 | United Kingdom . |
| WO9208136 | 5/1992 | WIPO . |

OTHER PUBLICATIONS

J.M. Rigotti; "Adjustable Transducer" IBM Technical Disclosure Bulletin, vol. 11, No. 9, Feb. 1969, p. 1126 XP002096509; NY US.

*Primary Examiner*—James R. Brittain
*Assistant Examiner*—Lewis Nguyen
*Attorney, Agent, or Firm*—Vincent A. Cichosz

[57] ABSTRACT

A bracket and washer combination providing secure holding and positioning of a magnetic sensor, wherein an optimal air gap is automatically set as the washer is brought into a slot of the bracket due to facial interaction therebetween. In one embodiment, the sidewalls of the slot have teeth of predetermined pitch, while the washer has smooth sidewalls. In a second embodiment, the sidewalls of the washer have teeth of a predetermined pitch angle, while the sidewalls of the slot are smooth. The member having toothed sidewalls is formed of a material harder than the member having smooth sidewalls. The washer and slot are dimensioned so that the sidewalls of the washer tightly abut the sidewalls of the slot, wherein the teeth of the toothed sidewalls inscribe corresponding grooves into the smooth sidewalls as the washer is pressed into the slot along a transverse axis. Consequently, as the corresponding grooves are inscribed, the washer sidewalls are caused to move in relation to the slot sidewalls in a direction parallel to the pitch of the teeth, resulting in a relative movement between the washer and the bracket along a longitudinal axis. However, since the washer is affixed by a bolt so that it is constrained from moving along the longitudinal axis, the relative movement is provided by the bracket moving along the longitudinal axis in relation to the washer.

20 Claims, 4 Drawing Sheets

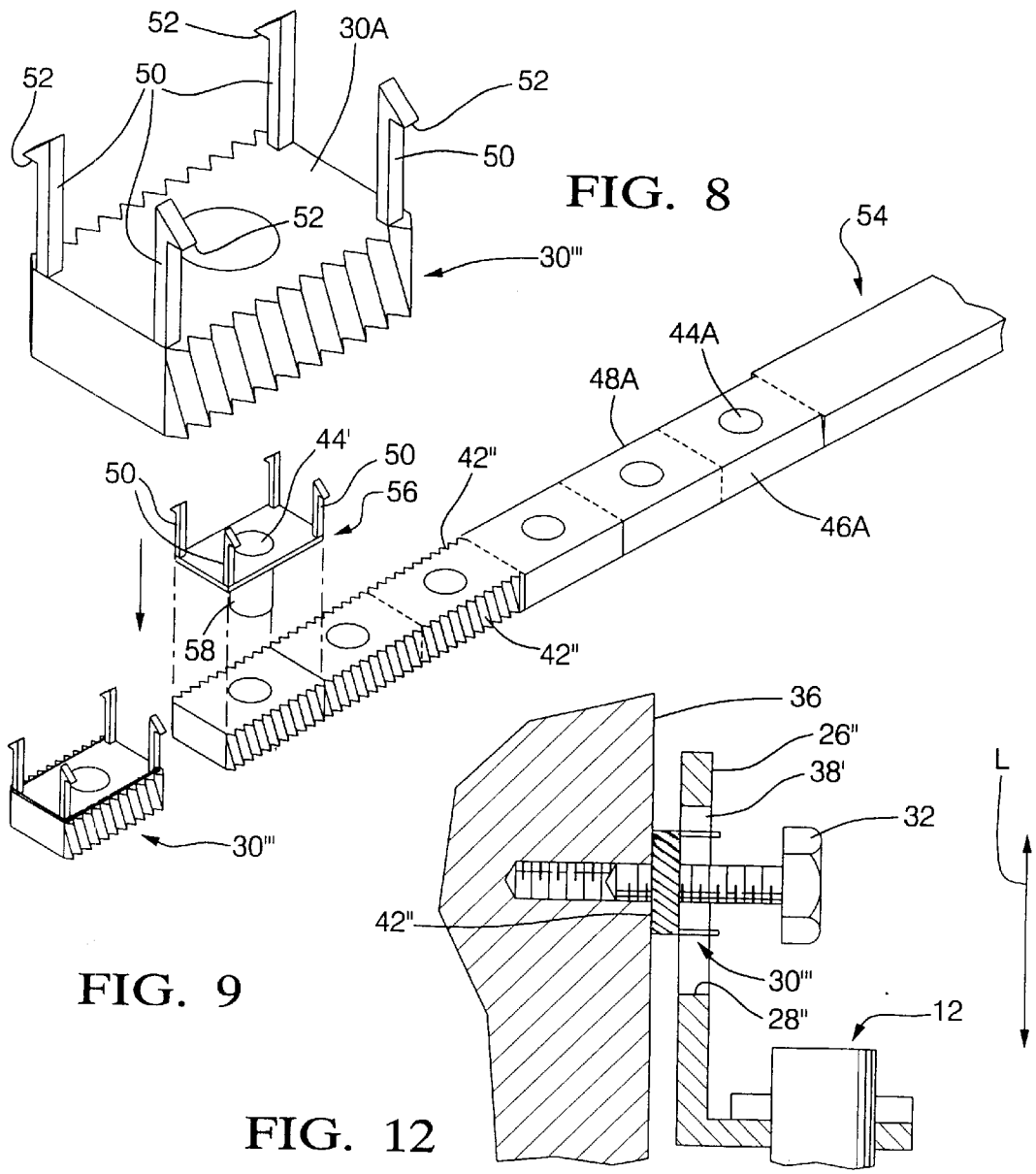
FIG. 8
FIG. 9
FIG. 12
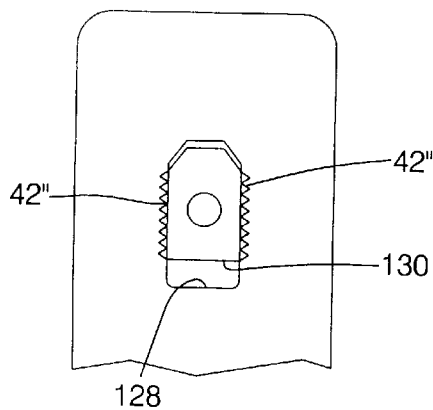
FIG. 10
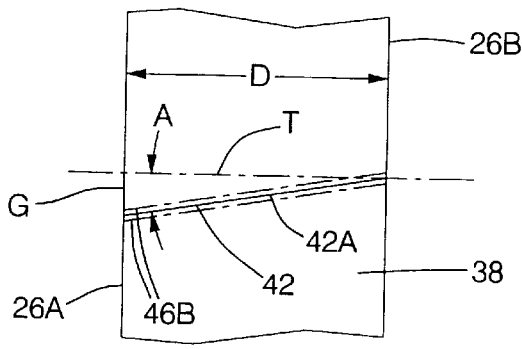
FIG. 11

WASHER AND BRACKET COMBINATION FOR AUTOMATICALLY SETTING AN AIR GAP

TECHNICAL FIELD

The present invention relates to brackets for holding a first object with respect to a second object. More particularly, the present invention relates to a bracket for precisely locating a sensor relative to an object to be sensed. Still more particularly, the present invention relates to a slotted bracket and washer combination, wherein facial interaction between the bracket and washer as they are brought together along a first axis results in the bracket moving a precisely predetermined distance relative to the washer along a second axis normal to the first axis, thereby automatically setting an air gap.

BACKGROUND OF THE INVENTION

Magnetic sensors operate on the principle of detecting magnetic flux density modulation caused by the movement of appropriately configured reluctors (or targets). The magnetic sensor must be affixed very close to the reluctor since its sensitivity decreases very rapidly with the size of the air gap between the reluctor and the magnetic sensor. In most automotive applications, for example, the air gaps are on the order of 0.3 to 1.75 mm. Over such a range of air gaps, the sensor output signal decreases more than ten times. The signal attenuation at large air gaps makes the sensor operation more prone to noise induced failures as well as less accurate in detecting the elements of the reluctor as it spins in relation to the magnetic sensor. Both of these factors are often unacceptable in critical engine control and diagnostic applications.

It may at first glance appear that there would be no problem whatsoever to choose and achieve an appropriate air gap between the magnetic sensor and the reluctor. However, in the majority of production cases, the stack-up of tolerances of the many different components randomly influence the net size of the air gap, which consequently precludes achieving, at each assembly, a precisely predetermined air gap by mere assembly of the parts. As a result, because of the random variations caused by accumulation of tolerances, mere assembly of the parts risks damaging interference between the magnetic sensor and reluctor on the one hand, and inaccurate readings associated with too large an air gap on the other hand. To lessen all the tolerances so that mere assembly assures, at each assembly, the optimum air gap is physically unrealistic and involves inordinate costs associated with manufacturing such precise parts.

The majority of magnetic sensors used in automotive applications involve non-adjustable air gap placement, wherein the stack-up of tolerances causes deviation from the optimal air gap. For example, a rigid bracket is affixed to the body of a magnetic sensor. The magnetic sensor is placed into a sensor port in the engine block, and the bracket is bolted, via a bolt hole in the bracket, to a threaded mounting hole in a mounting surface of the engine block. When the bracket is bolted, the length of the sensor body from the bolt hole of the bracket to the sensor tip determines the air gap with respect to the reluctor, which air gap is affected by the stack-up of tolerances. Even though subject to tolerance related placement inaccuracy, this structural mounting methodology is used widely because of the simplicity of the hardware, and ease of assembly and service.

In situations where air gap variation cannot be tolerated, the air gap is preset during magnetic sensor installation by means of an adjustable bracket, often referred to as a "side mount" bracket. The adjustability of side mount brackets resides in a bolt slot which allows for the bracket to be adjusted along the slot elongation relative to the threaded mounting hole of the mounting surface.

In one form of operation of side mount bracket, the sensor body is placed into the sensor port of the engine block such that the sensor tip is allowed to touch the surface of the reluctor, and then it is withdrawn a distance equal to the predetermined optimum air gap. This method is more time consuming and is error prone.

In another form of operation of side mount bracket, a sacrificial layer of soft abradable material is placed onto the sensor tip, wherein the thickness of the sacrificial layer is equal to the optimum air gap. Now, the installer need merely place the sensor body into the sensor port until the sensor tip touches the reluctor, and then tighten the bolt on the mounting surface with the sensor body retained at this position. During initial rotation of the reluctor, the sacrificial layer may abrade due to reluctor runout or differential thermal expansion without damage being incurred to the sensor body or the reluctor. The sacrificial layer may be either attached to the sensor body or be a part thereof, such as a protuberance, provided the sensor body is of a soft material. However, in the event the magnetic sensor must be re-installed, the abraded sacrificial layer will not be able to again provide position location as it was able to do when unabraded. Therefore, before dismounting the magnetic sensor, the bracket must be marked to indicate the correct position of the sensor body relative to the bracket so that when the new magnetic sensor is re-installed its position on the bracket can be sighted—not an exact procedure. In any event, should the sacrificial layer be exposed to a lubricating oil, the oil spray may carry the abraded debris into oil passageways.

In the prior art, it is known to precisely adjust the air gap using a threaded sensor body and threaded sensor port. This structure is generally used exclusively with magnetic sensors having a single sensing element and having sensing capability unaffected by sensor rotation around its longitudinal axis. In this approach, the sensor tip is brought into touching engagement with the reluctor, and then the sensor body is rotated a predetermined angular amount, wherein the pitch angle of the threads raises the tip a distance equal to the optimum air gap. However, most automotive magnetic sensors contain more than one sensing element and are designed to operate at only one particular angular setting around the sensor axis. Consequently, a threaded sensor body would need to be adjusted in whole revolution steps (i.e., 360 degrees) and air gap adjustment would then be in steps of the thread pitch. While the use of a sufficiently small pitch may render the air gap setting resolution adequate, many sensors are precluded from rotation due to geometrical interferences.

Accordingly, what is needed in the art is a structure for holding a magnetic sensor which allows easy and quick re-installation and removal of the magnetic sensor, and provides for automatic setting of an optimal air gap.

SUMMARY OF THE INVENTION

The present invention is a bracket and washer combination which provides secure holding of a magnetic sensor while automatically setting an optimal air gap, wherein operation is very quick, easy and reliable and wherein the air gap setting is precisely repeated each time a magnetic sensor is replaced or re-installed.

The bracket and washer combination according to the present invention are mutually structured so that as the washer is brought into a slot of the bracket, facial interaction therebetween causes movement of the bracket relative to the washer a predetermined distance along the elongation of the slot. In this regard, one of the slot sidewalls and the washer sidewalls is provided with teeth having a predetermined pitch angle, while the other of the slot sidewalls and washer sidewalls is smooth. The member having toothed sidewalls is formed of a material harder than the member having smooth sidewalls. The teeth of the toothed sidewalls may be provided in any suitable form, such as for example serrations, cutting ridges or cutting surfaces arranged along the pitch angle. A slight draft is preferred to be provided on the washer sidewalls to facilitate initial insertion of the washer with respect to the slot sidewalls.

The washer and slot are dimensioned so that the sidewalls of the washer tightly abut the sidewalls of the slot, wherein the teeth of the toothed sidewalls inscribe corresponding grooves into the smooth sidewalls as the washer is pressed into the slot along a transverse axis. Consequently, as the corresponding grooves are inscribed, the washer sidewalls are caused to move in relation to the slot sidewalls in a direction parallel to the pitch of the teeth, resulting in a relative movement along a longitudinal axis that is perpendicular to the transverse axis. However, since the washer is affixed by a bolt so that it is constrained from moving along the longitudinal axis, the relative movement is provided by the bracket moving in along the longitudinal axis in relation to the washer. The distance of relative movement along the longitudinal axis is given by: $D*\tan(A)=G$, wherein D is the depth of penetration of the washer into the slot of the bracket along the transverse axis, A is the pitch angle of the threads of the threaded sidewall, and G is the distance of movement of the bracket along the longitudinal axis and is equal to the desired optimum air gap.

In a first preferred form of the bracket and washer combination according to the present invention, mutually opposing sidewalls of the slot of the bracket provide the toothed sidewalls, wherein the material of the bracket is harder than the material of the washer. The pitch angle of the teeth of the toothed sidewalls is predetermined based upon a predetermined distance of movement of the washer along the transverse axis to result in a predetermined distance of movement of the bracket along the longitudinal axis (i.e., an amount equal to an optimum air gap).

In a second preferred form of the bracket and washer combination according to the present invention, mutually opposing sidewalls of the washer provide the toothed sidewalls, wherein the material of the washer is harder than the material of the bracket. The pitch angle of the teeth of the toothed sidewalls is predetermined as recounted immediately above to provide the predetermined distance of movement of the bracket along the longitudinal axis.

In operation, the installer places the sensor body of the magnetic sensor into the sensor port of the engine block such that the sensor tip touches the surface of the reluctor. A bolt carrying the washer is loosely threaded into the mounting hole of the mounting surface until the sidewalls of the washer touch the sidewalls of the slot. The installer continues to thread the bolt into the mounting hole, thereby causing the washer to be pressed into the slot along the transverse axis. As the washer penetrates into the slot, the toothed sidewalls inscribe the smooth sidewalls, resulting in the washer sliding parallel to and along the teeth. As the washer slides along the teeth, the pitch angle of the teeth results in the bracket moving in relation to the washer along the longitudinal axis. Upon the bolt being tightened, the washer will have moved a first predetermined distance relative to the bracket along the transverse axis, which, based upon the pitch angle of the teeth, results in the bracket moving a second predetermined distance along the longitudinal axis equal to an optimum air gap.

Now, should the magnetic sensor require servicing, it can be removed and reinstalled, or a new magnetic sensor can be installed in its place, using the installation procedure outlined above. In each case, the optimum air gap will be precisely achieved automatically. In the case of reinstallation, the original installation will have resulted in the washer and bracket becoming lodged together so as to resist mutual separation. Consequently, the magnetic sensor can be re-installed using the lodged washer and bracket combination and yet the same air gap will pertain because the original relative position between the mounting bolt and the bracket will be maintained.

Accordingly, it is an object of the present invention to provide a structure for holding one object relative to a second object, wherein a preset distance of separation with respect to a third object is automatically set.

It is a further object of the present invention to provide a bracket and washer combination, wherein a predetermined facial interaction between of the sidewalls of a slot of the bracket and the sidewalls of the washer provide a predetermined movement along the elongation of the slot in response to pressing of the washer into the slot.

It is another object of the present invention to provide a bracket and washer combination, the bracket having a slot, wherein one of the slot sidewalls and the washer sidewalls is provided with teeth and the other of the slot sidewalls and washer sidewalls is smooth, wherein when the washer is pressed into to slot the teeth sidewalls inscribe the smooth sidewalls, thereby causing the washer to slide along the teeth, and thereby resulting in a predetermined movement of the bracket relative to the washer in a direction perpendicular to the direction that the washer is pressed into the slot.

It is yet an additional object of the present invention to provide a washer and bracket combination for precisely locating a magnetic sensor relative to a reluctor, wherein the air gap therebetween is automatically set independent of stack-up of parts tolerances.

These, and additional objects, advantages, features and benefits of the present invention will become apparent from the following specification.

BRIEF DESCRIPTION OF THE DRAWINGS

FIG. 8 is a perspective view of a preferred form of washer according to the second for of the bracket and washer combination according to the present invention.

FIG. 9 is a perspective schematic view of a preferred process for fabricating of the washer shown in FIG. 8.

FIG. 10 is a side view of a variation of the second form of bracket and washer combination, wherein the slot of the bracket and the washer have readily identifiable complementary shapes to facilitate proper orientation of the washer with respect to the slot.

FIG. 11 is a side view illustration of the pitch angle of teeth of a toothed sidewall according to the present invention.

FIG. 12 is a partly sectional side view of the second form of bracket and washer combination according to the present invention, wherein a variation of the operation thereof is depicted.

DESCRIPTION OF THE PREFERRED EMBODIMENT

Figure 1:
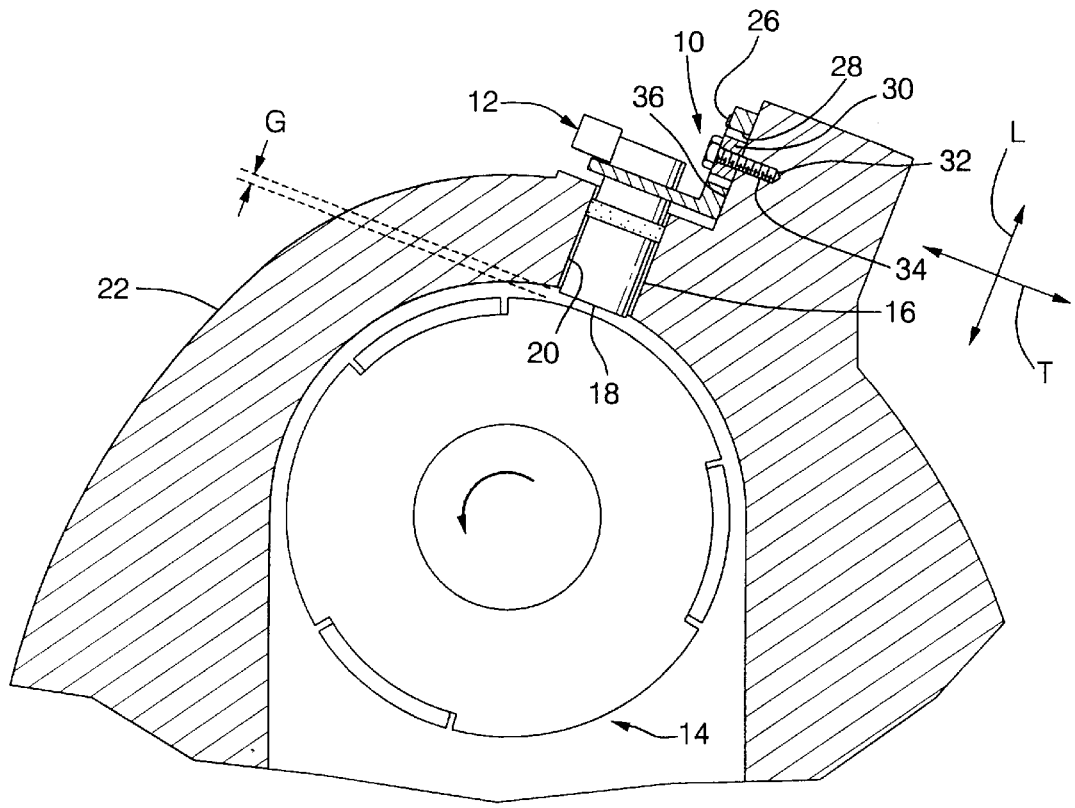
FIG. 1 is a partly sectional side view of the bracket and washer combination according to the present invention, shown in a typical environment of operation wherein a magnetic sensor is spaced from a reluctor a distance equal to an optimum air gap.

Referring now to the Drawings, FIG. 1 generally depicts the bracket and washer combination 10 according to the present invention in an exemplar environment of operation, wherein the bracket and washer combination serves to locate a magnetic sensor 12 with respect to a reluctor 14. In this regard, the magnetic sensor 12 has a sensor body 16 which includes a sensor tip 18. The sensor tip 18 extends into a sensor port 20 of an engine block 22 and is spaced from the reluctor 14 a predetermined distance equal to an optimum air gap G which provides optimal sensing performance by the magnetic sensor of magnetic field variations as the reluctor spins.

The bracket 26 of the sensor and washer combination 10 is affixed to the sensor body 16. The bracket 26 is of the "side mount" type, and may be L-shaped, as shown, or flatly connected with the sensor body having a configuration analogous to that of a flag and its flagpole. The bracket has a slot 28 which is elongated along a longitudinal axis L that is parallel to the cylindrical axis of the sensor body 16. The washer 30 of the bracket and washer combination 10 is dimensioned to fit into the slot 28 by a press-fit along a transverse axis T that is perpendicular to the longitudinal axis L. A bolt 32 carries the washer 30, passes through the slot 28 and threadably engages a threaded mounting hole 34 formed in a vertical mounting surface 36 (by the term "vertical" is meant oriented parallel to the center axis of the sensor port 20).

With reference additionally to the remaining FIGS. 2 through 12, the structure and function of the bracket and washer combination 10 will be described whereby the air gap G is automatically set when the washer 30 is press-fit into the slot 28.

Figure 2:
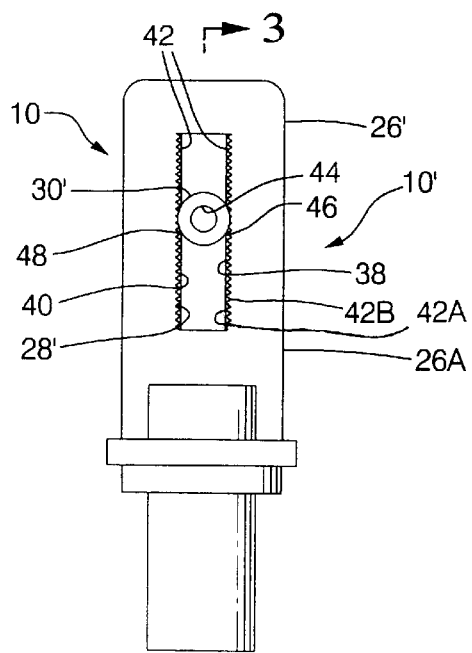
FIG. 2 is a front side view of a first form of bracket and washer combination according to the present invention.
Figure 3:
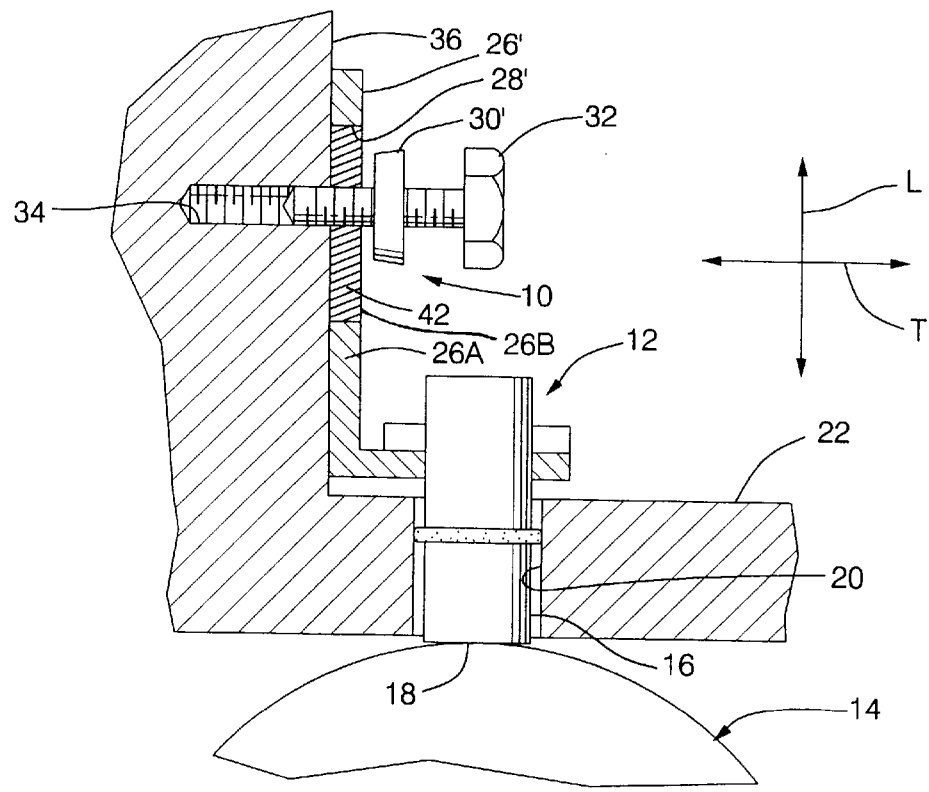
FIG. 3 is a partly sectional side view of the bracket and washer combination, wherein the first form of bracket and washer combination is seen along line 3—3 in FIG. 2, prior to mutual engagement.
Figure 4:
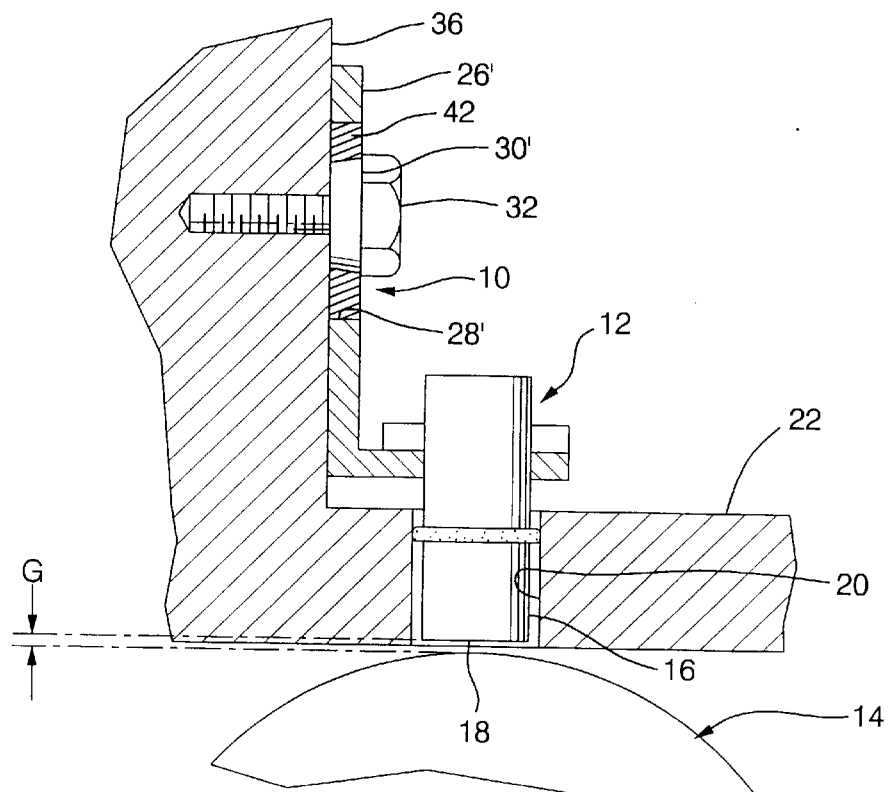
FIG. 4 is a partly sectional side view of the bracket and washer combination as seen in FIG. 3, wherein now the washer is fully engaged with respect to the bracket.

FIGS. 2 through 4 depict a first form of the bracket and washer combination 10', which is considered most preferred.

The bracket 26' includes a vertically oriented leg 26A having the slot 28' formed therein. The slot 28' has a pair of opposing slot sidewalls 38, 40 oriented parallel to the longitudinal axis L which are provided with a plurality of mutually parallel teeth 42. The teeth 42 are oriented at both slot sidewalls 38, 40 according to a predetermined pitch angle A (see FIG. 11) as measured with respect to the transverse axis T. The pitch angle A is negative, that is, having decreasing vertical displacement along the longitudinal axis L with increasing distance from an initial washer engagement surface 26B of the leg 26A. The teeth 42 may be finely spaced or coarsely spaced, and may be in any suitable form, such as for example serrations, cutting ridges or cutting surfaces arranged along the pitch angle.

The washer 30' is constructed of a softer material than that of the bracket 26' and has a center opening 44 for receiving therethrough the bolt 32. The washer 30' has opposing washer sidewalls 46, 48 which are smooth. As shown at FIG. 2, when the washer 30' is aligned over the slot 28, the washer sidewalls 46, 48 are located so as to overlap the crests 42A, but not the troughs 42B, of the teeth 42. Thus, for the washer 30' to be received into the slot 28', it must be press-fit therein, where during the teeth 42 inscribably cut or deform the slot sidewalls 38, 40. Preferably, the washer 30' has some draft, i.e., is somewhat conically shaped, so as to facilitate its initial placement into the slot 28' at the initial washer engagement surface 26B. It is preferred for the washer to be annular in shape, but other shapes may be used.

FIGS. 3 and 4 depict the bracket and washer combination 10' in operation.

The installer grasps the magnetic sensor 12 and places the sensor tip 18 of the sensor body 16 into the sensor port 20 of the engine block 22 so that the sensor tip touches the reluctor 14. The washer 30' is placed onto the bolt 32 and the bolt is loosely threaded into the mounting hole 34 of the mounting surface 36, wherein the leg 26A of the bracket 26' lies against the mounting surface, until the washer sidewalls 46, 48 touch the slot sidewalls 38, 40 (see FIG. 2). The installer continues to thread the bolt into the mounting hole, thereby causing the washer to be pressed into the slot along the transverse axis T. As the washer penetrates into the slot, the teeth of the slot sidewalls inscribe the smooth washer sidewalls. Because of the inscribing, the relative movement of the washer and bracket must be parallel to the pitch angle of the teeth, and the washer must slide along the teeth as it is pressed into the slot. Now, since the washer is constrained by the bolt from moving in any direction normal to the transverse axis, the bracket is forced to move along the longitudinal axis L. Thus, as the washer slides along the teeth, the pitch angle A of the teeth results in the bracket moving in relation to the washer (and bolt) along the longitudinal axis. Upon the bolt being tightened, the washer will have moved a first predetermined distance along the transverse axis in relation to the bracket, which, based upon the pitch angle, results in the magnetic sensor moving a second predetermined distance along the longitudinal axis, which is equal to an optimum air gap G. The magnitudes of the aforesaid movements are given by the relation D*tan (A)=G, wherein D is the depth of penetration of the washer into the slot of the bracket along the transverse axis, A is the pitch angle of the teeth of the slot sidewalls, and G is the distance of movement of the bracket along the longitudinal axis (see FIG. 11). The distance of movement D is determined when the bolt is tightened by the lesser of the thickness of the washer 30' and the leg 26A of the bracket 26', wherein preferably the thicknesses are equal.

FIGS. 5 through 10 and 12 depict a second form of the bracket and washer combination 10".

The bracket 26" includes a vertically oriented leg 26A' having the slot 28" formed therein. The slot 28" has a pair of opposing slot sidewalls 38', 40' which are smooth.

The washer 30" is constructed of a harder material than that of the bracket 26" and has a center opening 44' for receiving therethrough the bolt 32. The washer 30" has opposing washer sidewalls 46', 48' having teeth 42'. The teeth 42' are oriented at both washer sidewalls 46', 48' according to a predetermined pitch angle A as generally described above. However, now the washer is inserted into the slot so that the pitch angle A is positive, that is, having increasing vertical displacement along the longitudinal axis L with increasing distance from an initial bracket engagement surface 30A of the washer 30". The teeth 42' may be finely spaced or coarsely spaced, and may be in any known form, such as for example serrations, cutting ridges or cutting surfaces arranged along the pitch angle.

Figure 5:
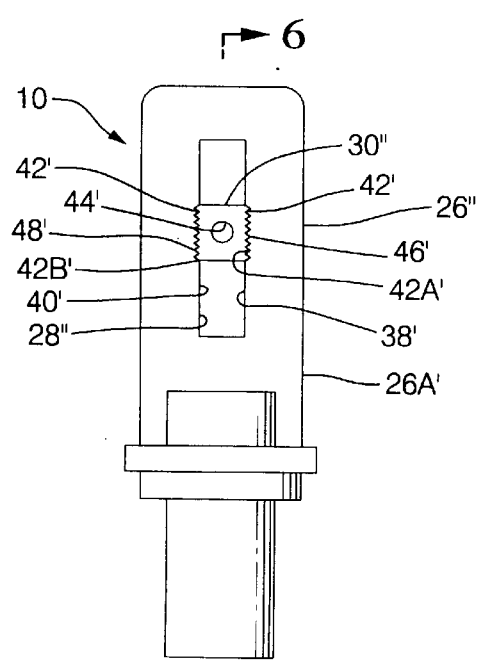
FIG. 5 is a front side view of a second form of bracket and washer combination according to the present invention.

As shown at FIG. 5, when the washer 30" is aligned over the slot 28", the washer sidewalls 46', 48' are located so that the crests 42A', but not the troughs 42B', of the teeth 42' overlap the slot. As previously recounted with regard to FIGS. 2 through 4, for the washer 30" to be received into the slot 28", it must be press-fit therein, whereduring the teeth 42' inscribably cut or deform the slot sidewalls 46', 48'. Preferably, the washer 30" has some draft, i.e., somewhat wedge-shaped, so as to facilitate initial placement of the washer into the slot. The washer is preferred to have a rectangular shape, but other shapes may be used.

Figure 6:
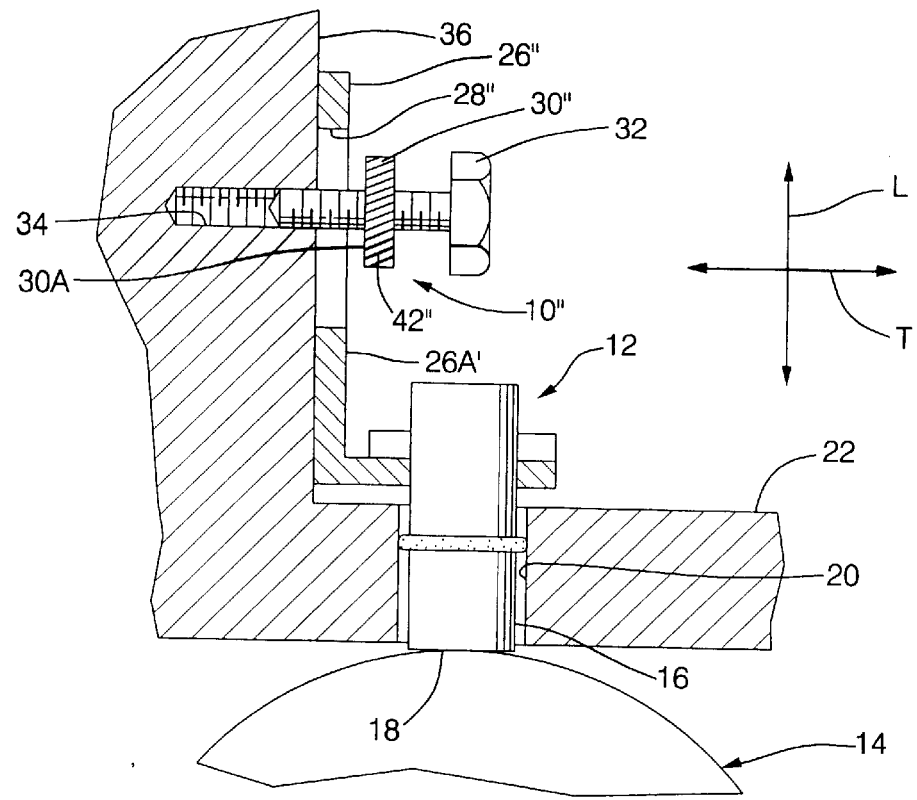
FIG. 6 is a partly sectional side view of the bracket and washer combination, wherein the second form of bracket and washer combination is seen along line 6—6 in FIG. 5, prior to mutual engagement.
Figure 7:
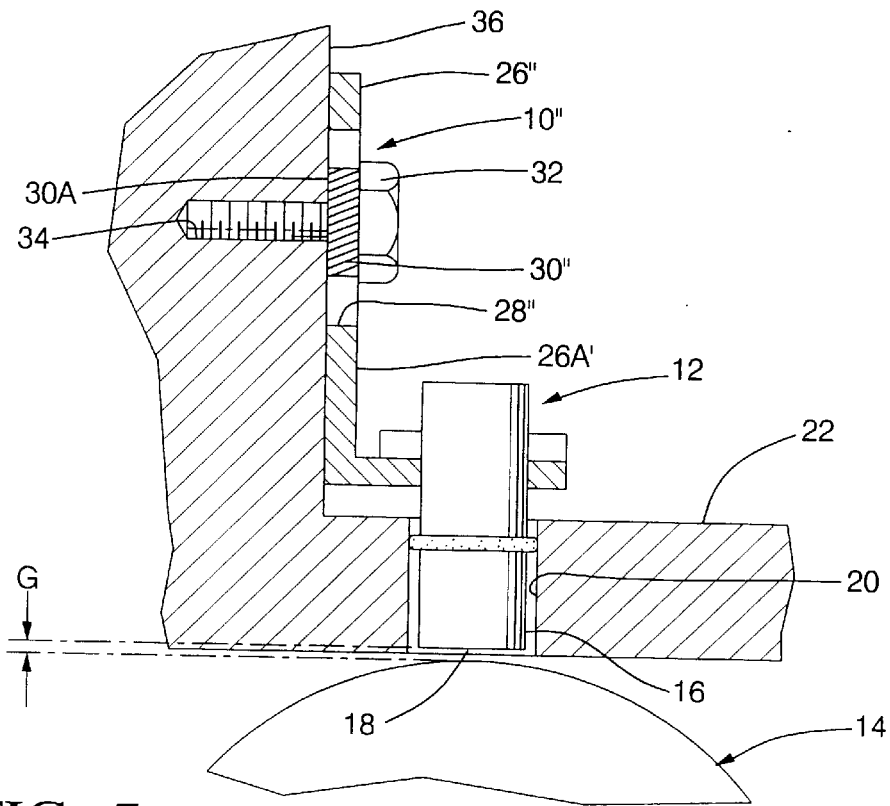
FIG. 7 is a partly sectional side view of the bracket and washer combination as seen in FIG. 6, wherein now the washer is fully engaged with respect to the bracket.

FIGS. 6 and 7 depict the bracket and washer combination 10" in operation.

The installer grasps the magnetic sensor 12 and places the sensor tip 18 of the sensor body 16 into the sensor port 20 of the engine block 22 so that the sensor tip touches the reluctor 14. The washer 30" is placed onto the bolt 32 and the bolt is loosely threaded into the mounting hole 34 of the mounting surface 36, wherein the leg 26A' of the bracket 26" lies against the mounting surface, until the washer sidewalls 46', 48' touch the slot sidewalls 38', 40' (see FIG. 5). The installer continues to thread the bolt into the mounting hole, thereby causing the washer to be pressed into the slot along the transverse axis T. As the washer enters the slot, the toothed washer sidewalls inscribe the smooth slot sidewalls. Because of the inscribing, the relative movement of the washer and bracket must be parallel to the pitch angle of the teeth, and the washer must slide along the teeth as it is pressed into the slot. Now, since the washer is constrained by the bolt from moving in any direction normal to the transverse axis, the bracket is forced to move along the longitudinal axis L. Thus, as the washer slides along the teeth, the pitch angle A of the teeth results in the bracket moving in relation to the washer (and bolt) along the longitudinal axis. Upon the bolt being tightened, the washer will have moved a first predetermined distance along the transverse axis in relation to the bracket, which, based upon the pitch angle, results in the magnetic sensor moving a second predetermined distance along the longitudinal axis, which is equal to an optimum air gap G. The magnitudes of the aforesaid movements are given, as recounted above, by the relation $D*\tan(A)=G$, wherein D is the depth of penetration of the washer into the slot of the bracket along the transverse axis, A is the pitch angle of the teeth of the washer sidewalls, and G is the distance of movement of the washer along the longitudinal axis. Again, the distance of movement D is determined when the bolt is tightened by the lesser of the thickness of the washer 30" and the leg 26A' of the bracket 26", wherein preferably the thicknesses are equal.

With regard to the embodiment shown in FIGS. 5, 6 and 7, it is critical that the washer 30" be inserted in the right orientation with respect to the slot so that the initial bracket engagement surface 30A first engages the bracket 26". Therefore, FIGS. 8 through 10 depict washers provided with alignment indication. The correct orientation of the washer 30" relative to the bracket is important so that the pitch angle of the teeth 42' causes the bracket be driven upwardly away from the reluctor 14 rather than downwardly toward the reluctor.

FIG. 8 depicts a washer 30'" having alignment fingers 50 upstanding from the initial bracket engagement surface 30A. The alignment fingers 50 each have barbs 52 for being placed through the slot 28" of the bracket 26" and grabbing the bracket at the sidewalls to thereby loosely hold the washer to the bracket prior to and/or during assembly (see for example FIG. 12). If the bracket 26" and washer 30'" are both composed of plastic, the washer can be made of a harder plastic than that of the bracket, and the alignment fingers 52 may be molded at the time of molding the washer (as shown in FIG. 8).

FIG. 9 schematically depicts a semi-continuous process for fabricating a metallic washer 30'". An incoming strip 54 of metal is subjected to a piercing step, wherein an oversized bolt hole 44A is provided with an annular dimple (not shown). The washer sidewalls 46A, 48A are next given a draft by milling or grinding. The teeth 42" are then provided on the washer sidewalls, such as by knurling or hobbing. A platform 56 (constructed of plastic or metal) having a hollow rivet 58 and the alignment fingers 50 is then pressed into the bolt hole and held thereto by interference fit at the annular dimple located opposite the platform. The inside diameter of the hollow rivet 58 now provides the bolt hole 44'.

Alternative to the washer being slidably attached to the bracket, the geometry of the washer and the associated slot of the bracket may be mutually configured to promote a relative orientation during the assembly procedure. FIG. 10 shows a washer 130 and bracket slot 128 having reciprocally complementing shapes which positively define the proper orientation of the washer relative to the bracket to ensure the threads 42" are correctly oriented. Shown in FIG. 10 are reciprocally complementary trapezoidal shapes. Other reciprocally complementary shapes that do not mutually interfere may be used, such as for example complementary T-shapes, reversed T-shapes, etc.

FIG. 12 exemplifies an alternative variation of operation of the bracket and washer combination 10, wherein the washer 30" is shown by way of example located between the bracket 26" and the mounting surface 36. When the bolt is tightened, the teeth 42" will inscribe the slot sidewalls (38' being shown) of the slot 28", thereby causing the bracket to move upwardly in relation to the reluctor (not shown) along the longitudinal axis L, as previously recounted. This arrangement has the advantage that the washer is not subjected to torque as the bolt is tightened, since there is no direct contact with the head of the bolt. However, this arrangement is less preferred than the foregoing operational descriptions in that there is now movement of the bracket along the transverse axis toward the mounting surface. Either embodiment of the bracket and washer combination 10 shown at FIGS. 2 or 5 may be alternatively operated to initially locate the washer between the mounting surface and the bracket.

It should be noted that by the term "smooth" as used herein is meant that the surface is able to accept inscribing by the teeth as described hereinabove, whether or not the surface is actually physically smooth.

To those skilled in the art to which this invention appertains, the above described preferred embodiments may be subject to change or modification. Such change or modification can be carried out without departing from the scope of the invention, which is intended to be limited only by the scope of the appended claims.

We claim:

1. A bracket and washer combination for automatically positioning the bracket relative to the washer along a longitudinal axis responsive to the washer being moved relative to the bracket along a transverse axis that is perpendicular to the longitudinal axis, comprising:

a bracket having a slot, said slot being elongated along a longitudinal axis, said slot having opposing slot sidewalls disposed parallel to the longitudinal axis;

a washer having opposing washer sidewalls; and tooth means located on a harder one of said slot sidewalls and said washer sidewalls for inscribing a softer of the other of said slot sidewalls and said washer sidewalls as said washer is received into said slot along a transverse axis.

2. The bracket and washer combination of claim 1, and wherein said tooth means comprises teeth having a predetermined pitch angle relative to the transverse axis; and wherein as said washer is penetratingly received into said slot, said teeth inscribe the other of said slot sidewalls and said washer sidewalls thereby causing said washer to move in relation to said bracket parallel to said pitch angle.

3. the bracket and washer combination of claim 2, further comprising means for allowing movement of said washer along the transverse axis, but preventing said washer from moving along the longitudinal axis.

4. The bracket and washer combination of claim 3, wherein said bracket moves in relation to said washer according to $D*\tan(A)=G$. wherein D equals a first relative distance of movement of said washer penetratingly into said slot along the transverse axis, wherein A equals the pitch angle, and wherein G equals a second distance of movement of said bracket relative to said washer along the longitudinal axis.

5. The bracket and washer combination of claim 4, wherein said pitch angle is an acute angle greater than zero degrees.

6. The bracket and washer combination of claim 5, wherein said washer has an initial bracket engagement surface; further wherein said washer sidewalls have a draft commencing at said initial bracket engagement surface.

7. The bracket and washer combination of claim 5, wherein said teeth are located at said slot sidewalls; and wherein said washer sidewalls are substantially smooth.

8. The bracket and washer combination of claim 5, wherein said teeth are located at said washer sidewalls; and wherein said slot sidewalls are substantially smooth.

9. The bracket and washer combination of claim 8, further comprising washer alignment indication means for assisting in providing a predetermined orientation of the pitch angle relative to said longitudinal axis when said washer is moved relative to said bracket along the transverse axis.

10. The bracket and washer combination of claim 9, wherein said washer has an initial bracket engagement surface; further wherein said washer alignment indication means comprises a plurality of barbed arms upstanding in relation to said initial bracket engagement surface of said washer.

11. The bracket and washer combination of claim 9, wherein said washer alignment indication means comprises predetermined reciprocally complementary shapes of said washer and said slot.

12. Apparatus for holding a sensor relative to a first surface and automatically spacing the sensor from an article, comprising:

a bracket connected to a sensor body, said bracket having a slot, said slot being elongated along a longitudinal axis, said slot having opposing slot sidewalls disposed parallel to the longitudinal axis;

a washer having opposing washer sidewalls;

tooth means located on a harder one of said slot sidewalls and said washer sidewalls for inscribing a softer of the other of said slot sidewalls and said washer sidewalls as said washer is penetratingly received into said slot along a transverse axis; and means for allowing movement of said washer along the transverse axis, but preventing said washer from moving along the longitudinal axis;

wherein said tooth means comprises teeth having an acute pitch angle relative to the transverse axis, said pitch angle being greater than zero degrees, and wherein as said washer is received into said slot said teeth inscribe the other of said slot sidewalls and said washer sidewalls thereby causing said washer to move in relation to said bracket parallel to said pitch angle; and wherein said bracket moves in relation to said washer according to $D*\tan(A)=G$, wherein D equals a first relative distance of movement of said washer penetratingly into said slot along the transverse axis, wherein A equals the pitch angle, and wherein G equals a second distance of movement of said bracket relative to said washer along the longitudinal axis.

13. The apparatus of claim 12, wherein said washer has an initial bracket engagement surface; further wherein said washer sidewalls have a draft commencing at said initial bracket engagement surface.

14. The apparatus of claim 13, wherein said teeth are located at said slot sidewalls; and wherein said washer sidewalls are substantially smooth.

15. The apparatus of claim 13, wherein said teeth are located at said washer sidewalls; and wherein said slot sidewalls are substantially smooth.

16. The apparatus of claim 15, further comprising washer alignment indication means for assisting in providing a predetermined orientation of the pitch angle relative to said longitudinal axis when said washer is moved relative to said bracket along the transverse axis.

17. The apparatus of claim 16, wherein said washer has an initial bracket engagement surface; further wherein said washer alignment indication means comprises a plurality of barbed arms upstanding in relation to said initial bracket engagement surface of said washer.

18. The apparatus of claim 16, wherein said washer alignment indication means comprises predetermined reciprocally complementary shapes of said washer and said slot.

19. A method for automatically spacing a first article from a third article responsive to moving the first article relative to a second article, said method comprising the steps of:

providing said slot in a first article, the slot having opposing first sidewalls;

providing said second article having opposing second sidewalls such that said second sidewalls tightly abut said first sidewalls when said second article penetrates into said slot;

forming teeth on one of said first sidewalls and said second sidewalls, wherein said teeth have a predetermined pitch angle relative to a transverse axis; and moving said second article a first distance receivingly into said slot along the transverse axis while simultaneously holding said second article from moving in any direction normal to the transverse axis;

wherein said step of moving results in at least a portion of said teeth inscribing corresponding grooves into the other of said first and second sidewalls such that the first and second articles are caused to move relative to each other parallel to said pitch angle; and wherein said step of moving results in said first article moving a second distance along a longitudinal axis which is perpendicular to the transverse axis.

20. The method of claim 19, further comprising, after said step of forming:

placing said first article touchingly against said third article;

wherein said second distance is equal to a gap formed between said first and third articles responsive to said step of moving; and wherein said first and second distances are defined by: $D*\tan(A)=G$, wherein D equals said first distance of movement, A equals said pitch angle, and G equals said second distance of movement.

* * * * *